United States Patent
Mack et al.

(10) Patent No.: US 10,147,981 B2
(45) Date of Patent: *Dec. 4, 2018

(54) SENSOR HOLD DOWN FINGER OF A BATTERY MODULE

(71) Applicant: Johnson Controls Technology Company, Holland, MI (US)

(72) Inventors: Robert J. Mack, Milwaukee, WI (US); Richard M. DeKeuster, Racine, WI (US); Michael L. Thompson, East Troy, WI (US); Mark R. Johnson, Milwaukee, WI (US); Jonathan P. Lobert, Hartford, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 511 days.

This patent is subject to a terminal disclaimer.

(21) Appl. No.: 14/754,240

(22) Filed: Jun. 29, 2015

(65) Prior Publication Data

US 2016/0380316 A1 Dec. 29, 2016

(51) Int. Cl.
| | |
|---|---|
| *H01M 10/48* | (2006.01) |
| *H01M 2/10* | (2006.01) |
| *H01M 10/42* | (2006.01) |
| *H01M 2/20* | (2006.01) |
| *H01M 10/0525* | (2010.01) |

(52) U.S. Cl.
CPC ......... *H01M 10/48* (2013.01); *H01M 2/1077* (2013.01); *H01M 2/206* (2013.01); *H01M 10/4257* (2013.01); *H01M 10/486* (2013.01); *H01M 10/0525* (2013.01); *H01M 2220/20* (2013.01); *Y02E 60/122* (2013.01)

(58) Field of Classification Search
CPC ............................ H01M 2/206; H01M 2/1077
See application file for complete search history.

(56) References Cited

U.S. PATENT DOCUMENTS

| | | |
|---|---|---|
| 5,686,202 A | 11/1997 | Hooke et al. |
| 7,572,550 B2 | 8/2009 | Saito et al. |
| 8,603,660 B2 | 12/2013 | Houchin-Miller et al. |
| | (Continued) | |

FOREIGN PATENT DOCUMENTS

CN            203414206 U      1/2014

OTHER PUBLICATIONS

PCT/US2016/017659 International Search Report and Written Opinion dated Jun. 8, 2016.

*Primary Examiner* — Helen Oi K Conley
(74) *Attorney, Agent, or Firm* — Fletcher Yoder P.C.

(57) ABSTRACT

The present disclosure a battery module having electrochemical cells and a bus bar carrier. The bus bar carrier includes a finger having a first surface, a second surface opposite to the first surface and configured to be disposed proximate to a first electrochemical cell of the plurality of electrochemical cells, a thickness extending between the first surface and the second surface, an opening extending through the first surface, through the thickness, and through the second surface, and a cavity disposed adjacent to the opening and exposed through the second surface of the finger. The battery module also includes a lead wire passing through the opening from the first surface of the finger to the second surface of the finger, and a sensor coupled to the lead wire to enable communication between the sensor and the first electrochemical cell, wherein the sensor is disposed in the cavity.

22 Claims, 8 Drawing Sheets

(56) References Cited

U.S. PATENT DOCUMENTS

2012/0301747 A1  11/2012  Han et al.
2013/0260197 A1  10/2013  Okada et al.
2014/0055086 A1   2/2014  Malackowski et al.
2014/0227570 A1   8/2014  Hoshi et al.
2015/0079437 A1   3/2015  Jeong et al.

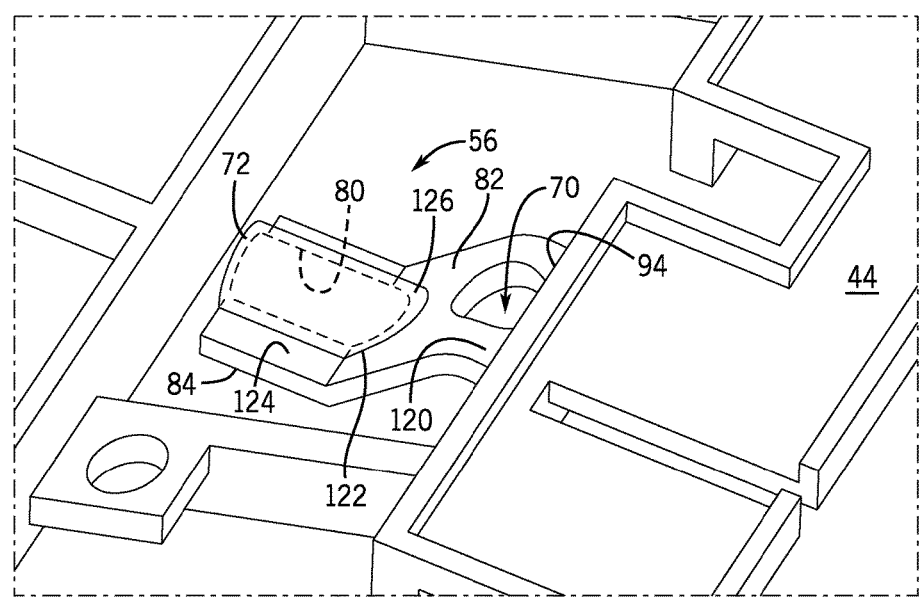
FIG. 8
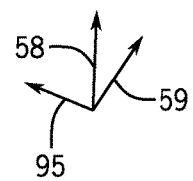

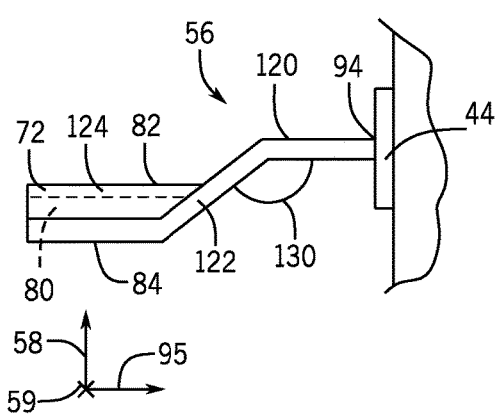
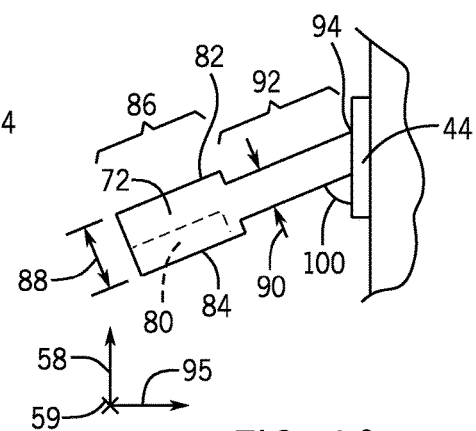
FIG. 9              FIG. 10
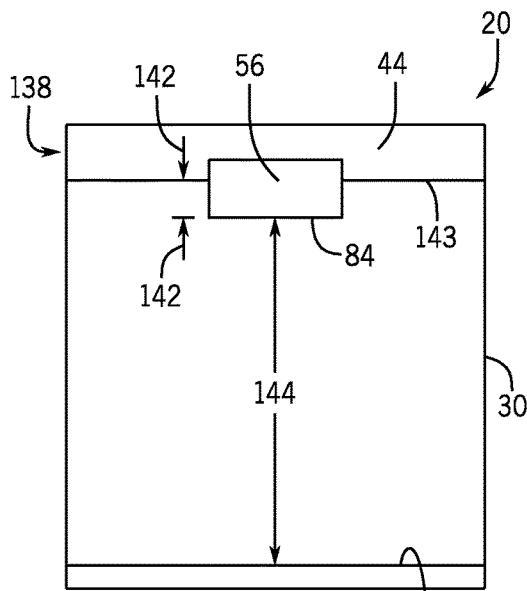
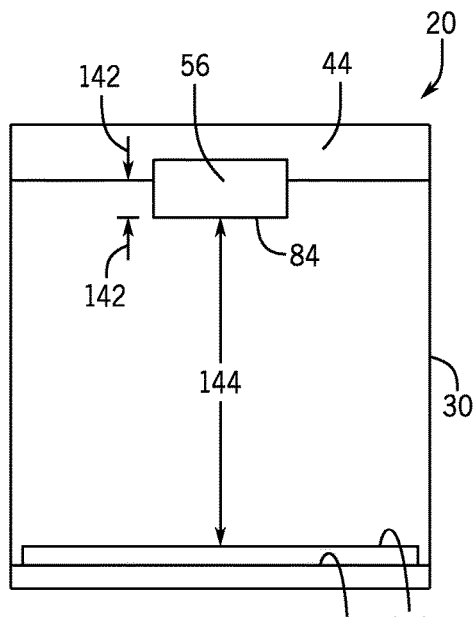
FIG. 11              FIG. 12

SENSOR HOLD DOWN FINGER OF A BATTERY MODULE

BACKGROUND

The present disclosure relates generally to the field of batteries and battery modules. More specifically, the present disclosure relates to retention features (e.g., a finger) of a battery module for retaining a sensor, for providing communication between the sensor and an electrochemical cell of the battery module, and for holding down the electrochemical cell.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, monitoring operating conditions (e.g., temperature and/or voltage) of traditional battery modules (or components thereof) may be expensive, may include bulky components/assemblies, and/or may require lengthy/costly manufacturing processes. Accordingly, it is now recognized that improved systems and methods for monitoring operating conditions of a battery module are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module having electrochemical cells and a bus bar carrier. The bus bar carrier includes a finger having a first surface, a second surface opposite to the first surface and configured to be disposed proximate to a first electrochemical cell of the plurality of electrochemical cells, a thickness extending between the first surface and the second surface, an opening extending through the first surface, through the thickness, and through the second surface, and a cavity disposed adjacent to the opening and exposed through the second surface of the finger. The battery module also includes a lead wire passing through the opening from the first surface of the finger to the second surface of the finger, and a sensor coupled to the lead wire to enable communication between the sensor and the first electrochemical cell, wherein the sensor is disposed in the cavity.

The present disclosure also relates to a battery module. The battery module includes a lithium-ion (Li-ion) electrochemical cell having a terminal end that includes at least one terminal. The battery module also includes a bus bar carrier disposed over the Li-ion electrochemical cell and proximate to the terminal end. The bus bar carrier includes a finger integral with the bus bar carrier along an edge of the finger. The finger includes a first portion extending from the edge and having a first thickness, and a second portion having a second thickness greater than the first thickness. An opening is disposed through the first portion and a cavity is disposed in the second portion. The cavity is exposed to the terminal end of the Li-ion electrochemical cell. The battery module also includes a sensor disposed in the cavity and in communication with the Li-ion electrochemical cell, and a lead wire extending from the sensor and through the opening.

The present disclosure also relates to a bus bar carrier of a battery module having a finger integral with the bus bar carrier only along a first edge of the finger. The finger includes the first edge, a first portion extending from the first edge and having a first thickness, a second portion extending from the first portion and having a second thickness greater than the first thickness, an opening disposed through the first portion, and a cavity disposed in the second portion and exposed along a bottom surface of the second portion.

DRAWINGS

Various aspects of this disclosure may be better understood upon reading the following detailed description and upon reference to the drawings in which:

FIG. 8 is an overhead perspective view of an embodiment of a bus bar carrier for use in the battery module of FIG. 3, in accordance with an aspect of the present disclosure;

FIG. 9 is a side schematic view of an embodiment of a sensor finger hold down for use in the battery module of FIG. 3, in accordance with an aspect of the present disclosure;

FIG. 10 is a side schematic view of an embodiment of a sensor finger hold down for use in the battery module of FIG. 3, in accordance with an aspect of the present disclosure;

FIG. 11 is a side schematic view of an embodiment of the battery module of FIG. 3, in accordance with an aspect of the present disclosure; and FIG. 12 is a side schematic view of an embodiment of the battery module of FIG. 3, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., Lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, a battery module includes electrochemical cells, a housing configured to retain or hold the electrochemical cells, and one or more covers configured to be disposed over an open side of the housing to seal the housing. Further, the battery module may include a bus bar carrier disposed within the housing and over the electrochemical cells (e.g., between the electrochemical cells and a cover of the battery module) that retains bus bars of the battery module and includes other features in accordance with embodiments of the present disclosure. For example, the bus bar carrier may include one or more flexible fingers extending toward the electrochemical cells and configured to exert a force against the electrochemical cells. Further, certain of the fingers may include a cavity configured to receive a sensor that senses operating conditions (e.g., voltage and/or temperature) of the battery module (or electrochemical cells thereof). For example, the sensor may be sandwiched between a bottom surface defining at least a portion of the cavity of the finger and a corresponding one of the electrochemical cells. The finger(s) having the cavity may also include an opening disposed adjacent to the cavity to enable a lead to extend from the sensor (e.g., proximate to the bottom surface of the finger), though the opening, and above a top surface of the finger opposite to the bottom surface of the finger.

Figure 1:
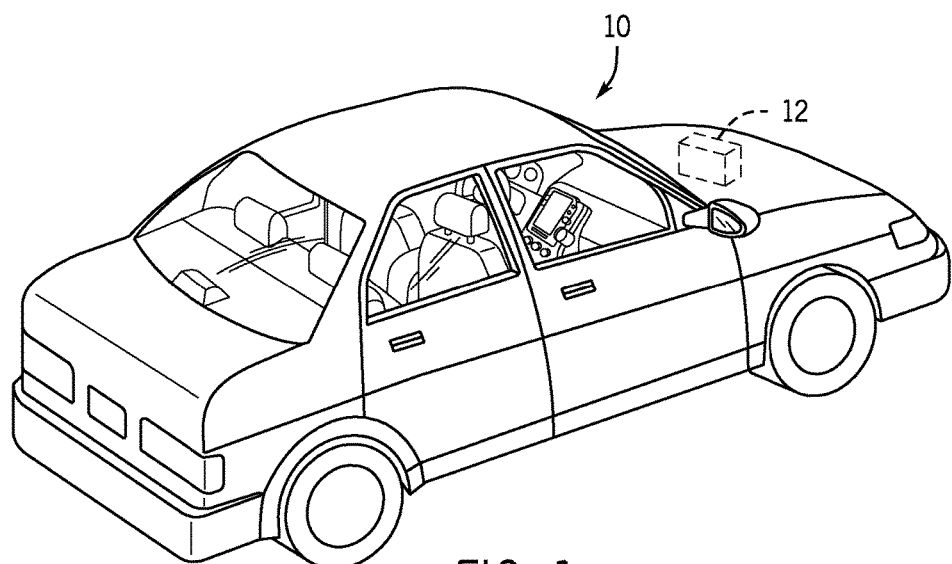
FIG. 1 is a perspective view of an embodiment of vehicle having a battery system configured in accordance with present embodiments to provide power for various components of the vehicle, in accordance with an aspect of the present disclosure.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
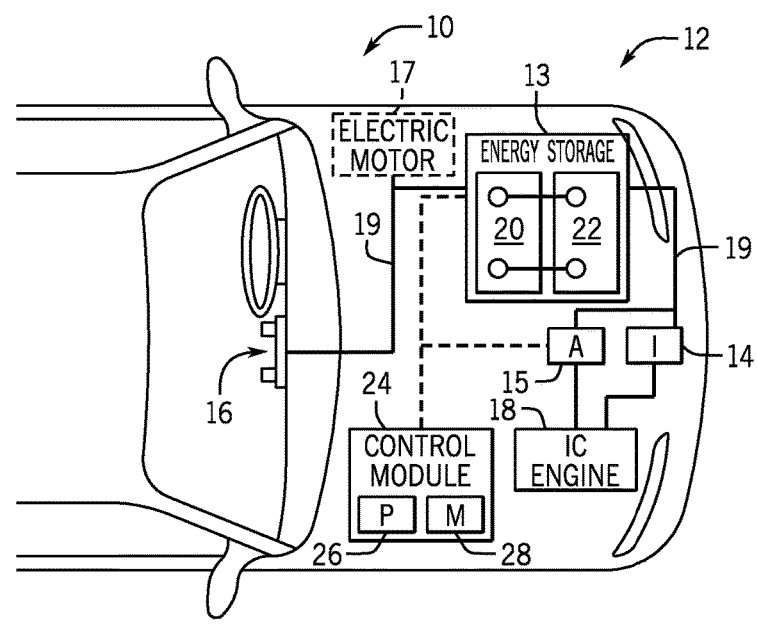
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
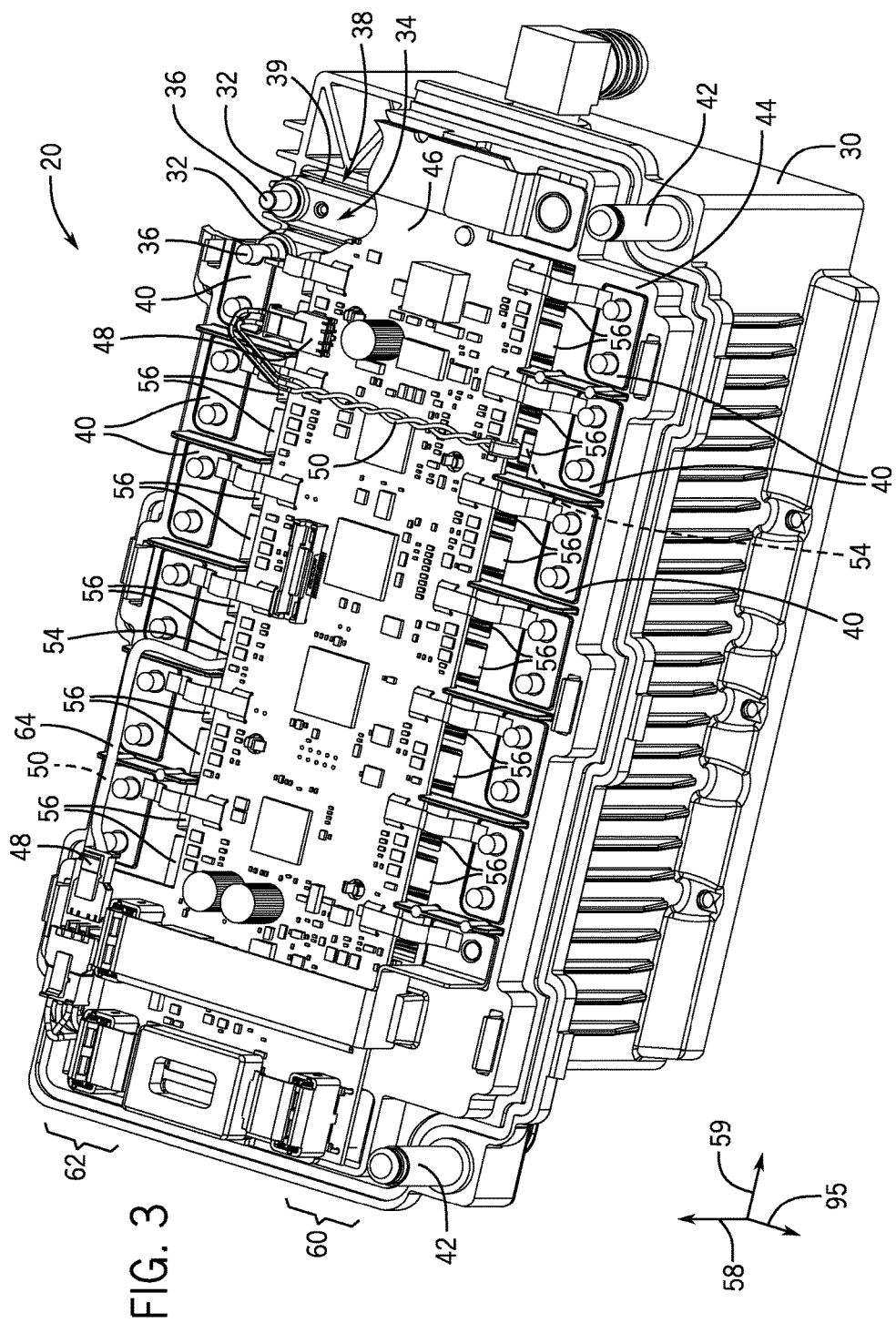
FIG. 3 is an overhead perspective view of an embodiment of a battery module for use in the vehicle of FIG. 1, in accordance with an aspect of the present disclosure.

Turning now to FIG. 3, an overhead perspective view of an embodiment of the battery module 20 (e.g., lithium-ion [Li-ion] battery module) for use in the vehicle 10 of FIG. 1 is shown. The battery module 20 includes a housing 30 and electrochemical cells 32 (e.g., prismatic Li-ion electrochemical cells) disposed within the housing 30. Normally, one or more covers are disposed over the housing 30 to seal the housing. For clarity, the cover is not shown in the illustrated embodiment.

As shown, each electrochemical cell 32 includes a terminal end 34 having one or more terminals 36 disposed thereon, and a base 38 (e.g., a base end) disposed opposite to the terminal end 34. A body 39 of the electrochemical cell 32 extends between the terminal end 34 and the base 38. The electrochemical cells 32 are electrically interconnected via bus bars 40 that span between, and contact, terminals 36 of adjacent electrochemical cells 32. For example, one bus bar 40 extends between a first terminal 36 (e.g., positive terminal) of a first electrochemical cell 32 and a second terminal 36 (e.g., negative terminal) of a second electrochemical cell 32 immediately adjacent the first electrochemical cell. The electrochemical cells 32 of the battery module 20 may be coupled in series, in parallel, or some in series and some in parallel. Together, the bus bars 40 and the electrochemical cells 32 form a group of electrically interconnected electrochemical cells 32 that supply the power (e.g., charge) of the battery module 20. For example, the group of electrically interconnected electrochemical cells is coupled on either end of the group to a corresponding major terminal 42 of the battery module 20. The major terminals 42 are configured to be coupled to a load (e.g., of the vehicle 10 of FIG. 1) such that the charge supplied by the group of electrically interconnected electrochemical cells 32 may power the load.

In accordance with present embodiments, the bus bars 40 and other features of the battery module 20 may be disposed on a bus bar carrier 44 of the battery module 20. The bus bar carrier 44 may include a plastic base material (or some other electrically isolative material) to electrically isolate certain components of the battery module 20 and the electrochemical cells 32 thereof. For example, a printed circuit board (PCB) 46 is disposed on the bus bar carrier 44. In some embodiments, the PCB 46 may be coupled to the bus bar carrier 44, for example by clips, adhesive, welding, or some other coupling mechanism. The PCB 46 may be configured to receive signals relating to various operating conditions (e.g., temperature or voltage) of the battery module 20, to analyze the signals and corresponding operating conditions, to provide feedback (e.g., to an operator) based on the analyzed signals and corresponding operating conditions, and/or to control functionality of the battery module 20 based on the analyzed signals and corresponding operating conditions.

The PCB 46 may include a number of inputs configured to receive the signals (and/or other signals) described above. For example, as shown, the PCB 46 includes clip inputs 48. Each clip input 48 may include a cavity having electrical contact points and configured to receive a plug. The plug may also include electrical contact points configured to contact the electrical contact points within the clip input 48, for example after the plug is inserted into (e.g., clipped into) the clip input 48. A lead wire 50 may extend from the plug and to a sensor 54 (e.g., a sensor configured to detect temperature, voltage, or both) of the battery module 20. For example, the lead wire 50 may extend through an opening in a finger 56 of a group of fingers 56 of the bus bar carrier 44, such that the sensor 54 coupled to the lead wire 50 is disposed under (e.g., hidden under) the finger 56. Thus, the sensor 54 is disposed under the finger 56 and is in communication (e.g., fluid communication, electrical communication) with one of the electrochemical cells 32 disposed in the housing 30 and under the finger 56 of the bus bar carrier 44.

In accordance with embodiments of the present disclosure, the bus bar carrier 44 may include fingers 56 (e.g., the group of fingers 56) configured to press against the terminal ends 34 of the electrochemical cells 32. The fingers 56 may be integral with the bus bar carrier 44 along one or more edges (e.g., only one edge) of each fingers 56. Further, the fingers 56 may extend downwardly (e.g., opposite to direction 58) at an angle with respect to direction 58. Further still, the fingers 56 may be configured to flex in response to a pressure exerted upwardly (e.g., in direction 58) against the fingers 56. As shown, the fingers 56 may be disposed in a first row 60 and in a second row 62 (e.g., each row 60, 62 extending along direction 59) such that each electrochemical cell 32 is held down by two fingers 56, one from each row 60, 62. Further, as shown, at least one of the fingers 56 may include features configured to interface with the sensor 54 described above. For example, the finger 56 may include an opening configured to receive the lead wire 50 such that the lead wire 50 may pass through the finger 56, and a cavity in the finger 56 configured to receive (e.g., at least partially retain) the lead wire 50, sensor 54, or both. The cavity may be exposed through a bottom of the finger 56 such that the sensor 54 may be in communication (e.g., fluid communication, electrical communication) with the electrochemical cell 32 corresponding with the finger 56. It should be noted that the battery module 20 may include any number of sensors 54 and corresponding fingers 56 configured to receive the sensors 54. For example, the illustrated embodiment of the battery module 20 includes two sensors 54 and corresponding lead wires 50. For clarity, one of the lead wires 50 is illustrated as being exposed, and the other one of the lead wires 50 is illustrated within a protective casing 64. Generally, both lead wires 50 are disposed within a corresponding protective casing 64 (e.g., cylindrical tube or harness).

Figure 4:
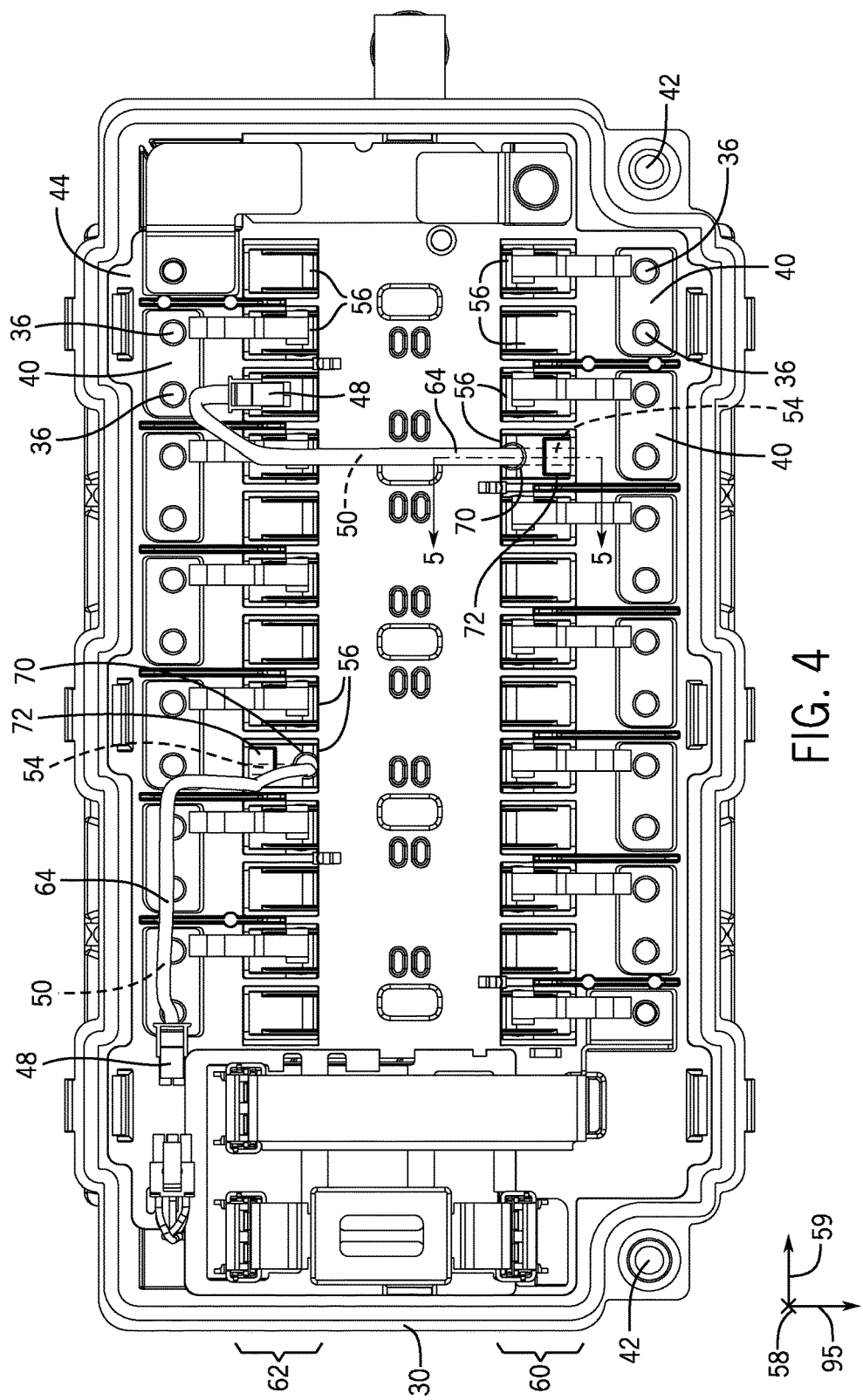
FIG. 4 is a plan view of an embodiment of the battery module of FIG. 3 and a bus bar carrier thereof, in accordance with an aspect of the present disclosure.

Turning now to FIG. 4, a top view of an embodiment of the battery module 20 of FIG. 3 and the bus bar carrier 44 thereof is shown. For clarity (e.g., to show the fingers 56), the PCB 46 from FIG. 3 is not shown in FIG. 4. As previously described, the battery module 20 may include two rows 60, 62 of fingers 56 configured to press against (e.g., hold down) the electrochemical cells 32 hidden beneath the bus bar carrier 44 in the illustrated embodiment. One or more of the fingers 56 may include features configured to enable retention of one or more corresponding sensors 54. For example, at least one of the fingers 56 may include an opening 70 configured to receive the lead wire 50 and corresponding protective casing 64 to enable the lead wire 50 to extend from above the finger 56 to below the finger 56 (e.g., opposite to direction 58).

Further, the fingers 56 that interface with the corresponding sensors 54 and/or lead wires 50 may also each include a cavity exposed to the corresponding electrochemical cell 32 at least partially hidden underneath the finger 56. The cavity may retain the sensor 54 between the finger 56 and the electrochemical cell 32, which enables communication (e.g., fluid communication, electrical communication) between the sensor 54 and the electrochemical cell 32. As shown, a bulge 72 of material may be formed on top of the finger 56 having the sensor 54 to compensate (e.g., structurally compensate) for the reduction of material in the finger 56 due to the cavity. In other words, the bulge 72 of material may increase a thickness of the finger 56 proximate to the cavity, such that the finger 56 is equally rigid proximate to the cavity of the finger 56 as other areas of the finger 56. The cavity and other features of the finger 56 will be described in detail below with reference to later figures.

Figure 5:
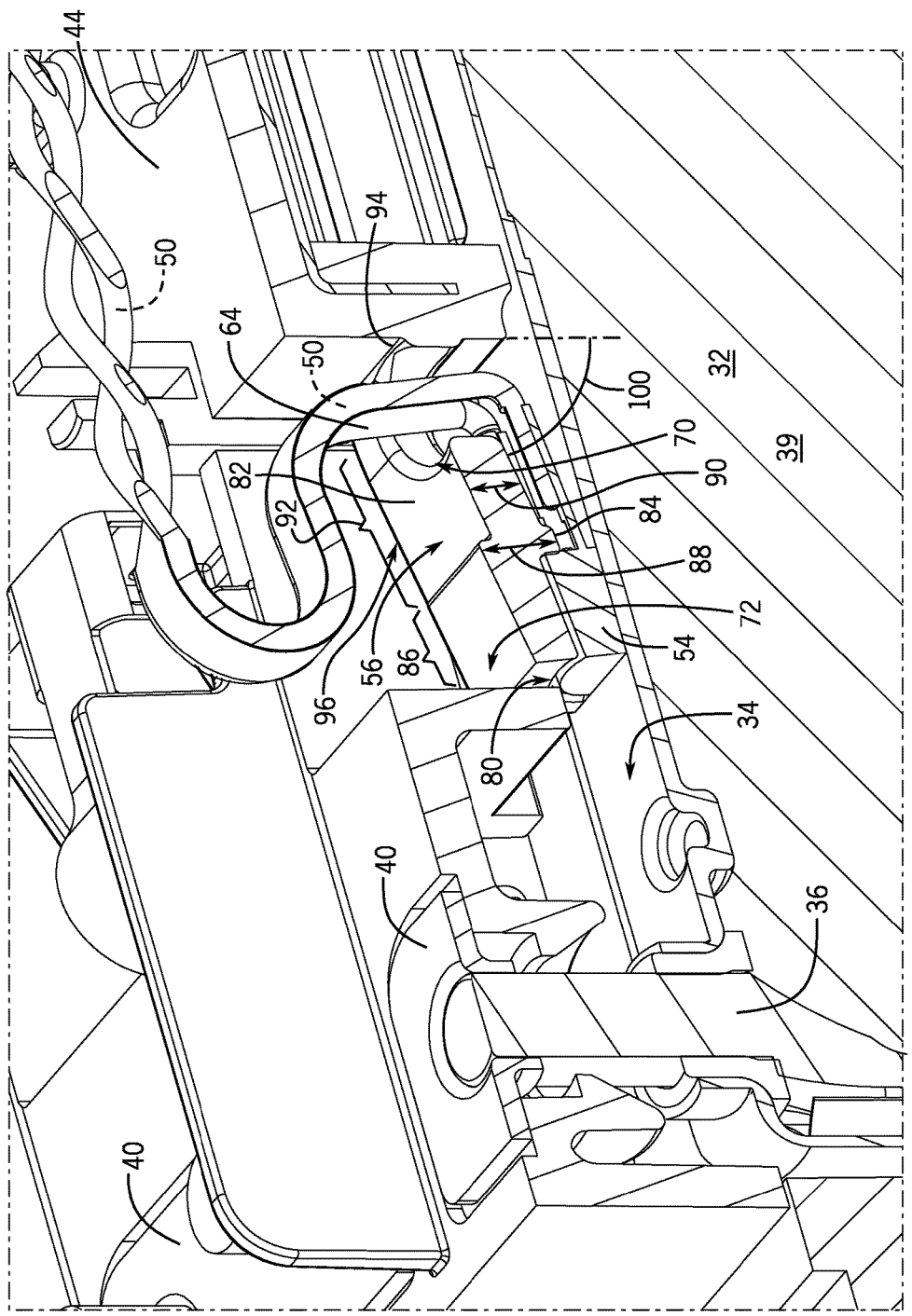
FIG. 5 is a cross-sectional perspective view of a portion of an embodiment of the battery module of FIG. 4 having the bus bar carrier, a finger hold down of the bus bar carrier, and other components taken along line 5-5 in FIG. 4, in accordance with an aspect of the present disclosure.

For example, a cross-sectional perspective view of a portion of an embodiment of the battery module 20 having the bus bar carrier 44, the finger 56 of the bus bar carrier 44, and other components taken along line 5-5 in FIG. 4 is shown in FIG. 5. In the illustrated embodiment, as previously described, the finger 56 includes the opening 70 configured to receive the lead wire 50 (and/or a protective casing 64 disposed around the lead wire 50). Further, the finger 56 includes a cavity 80 configured to receive the sensor 54 and to sandwich the sensor 54 between the finger 56 and the electrochemical cell 32 beneath the finger 56. For example, the finger 56 includes a first surface 82 (e.g., a top surface), a second surface 84 (e.g., a bottom surface) opposite to the first surface 82, and a thickness between the first surface 82 and the second surface 84.

The opening 70 of the finger 56 extends through the first surface 82, the thickness, and the second surface 84 of the finger 56. In the illustrated embodiment, the cavity 80 is a partial cylindrical cut-out in the second surface 84 of the finger 56. Thus, the lead wire 50 extends through the opening 70 (e.g., from the first surface 82 to the second surface 84) and couples to the sensor 54, which is disposed in the cavity 80 and between the second surface 84 of the finger 56 and the terminal end 34 of the electrochemical cell 32. As previously described, the bulge 72 of material above the cavity 80 may be included on the finger 56 (e.g., on a first portion 86 of the finger 56) to provide structural rigidity to the finger 56. Accordingly, the thickness of the first portion 86 of the finger 56 (e.g., outside of the cavity 80) may be a greater distance 88 than a distance 90 of the thickness of a second portion 92 of the finger 56 adjacent to the first portion 86 of the finger 56. The second portion 92 of the finger 56 (or an additional portion adjacent to the second portion 92) may be integral with the bus bar carrier 44 along an edge 94 of the finger 56. In some embodiments, the edge 94 may be less thick than the second portion 92. Further, the opening 70 may be disposed through the second portion 92.

In some embodiments, the finger 56 may be integral with the bus bar carrier 44 only along the edge 94 (e.g., of the second portion 92) and not along a side 96 of the finger 56, which may enable the finger 56 to flex (e.g., rotate) upwardly (e.g., in direction 58 and/or about direction 95) in response to a force exerted by the electrochemical cell 32 against the finger 56 (or against the sensor 54 sandwiched between the finger 56 and the electrochemical cell 32, which transfers at least a portion of the force to the finger 56). Further, the finger 56 may be angled (e.g., at a non-right angle 100) downwardly (e.g., relative to a surface 101 of the bus bar carrier 44 from which the finger 56 extends) such that the finger 56 (or the sensor 54 retained by the finger 56) contacts the terminal end 34 of the electrochemical cell 32 and/or presses against the terminal end 34. It should be noted that the angle 100 may be calibrated to enable a desired force exerted by the finger 56 against the terminal end 34 of the electrochemical cell 32.

Figure 6:
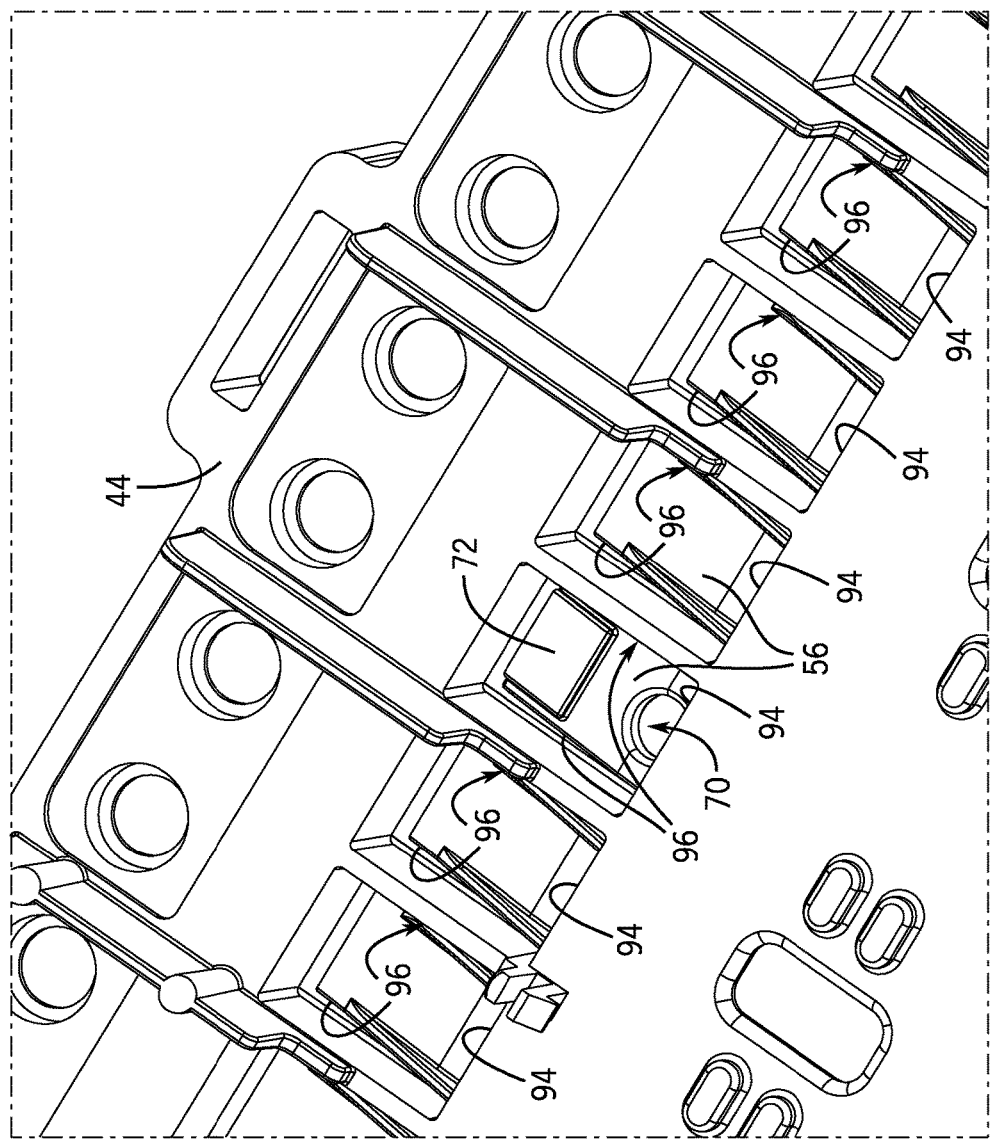
FIG. 6 is an overhead perspective view of an embodiment of the bus bar carrier of FIG. 4, in accordance with an aspect of the present disclosure.
Figure 7:
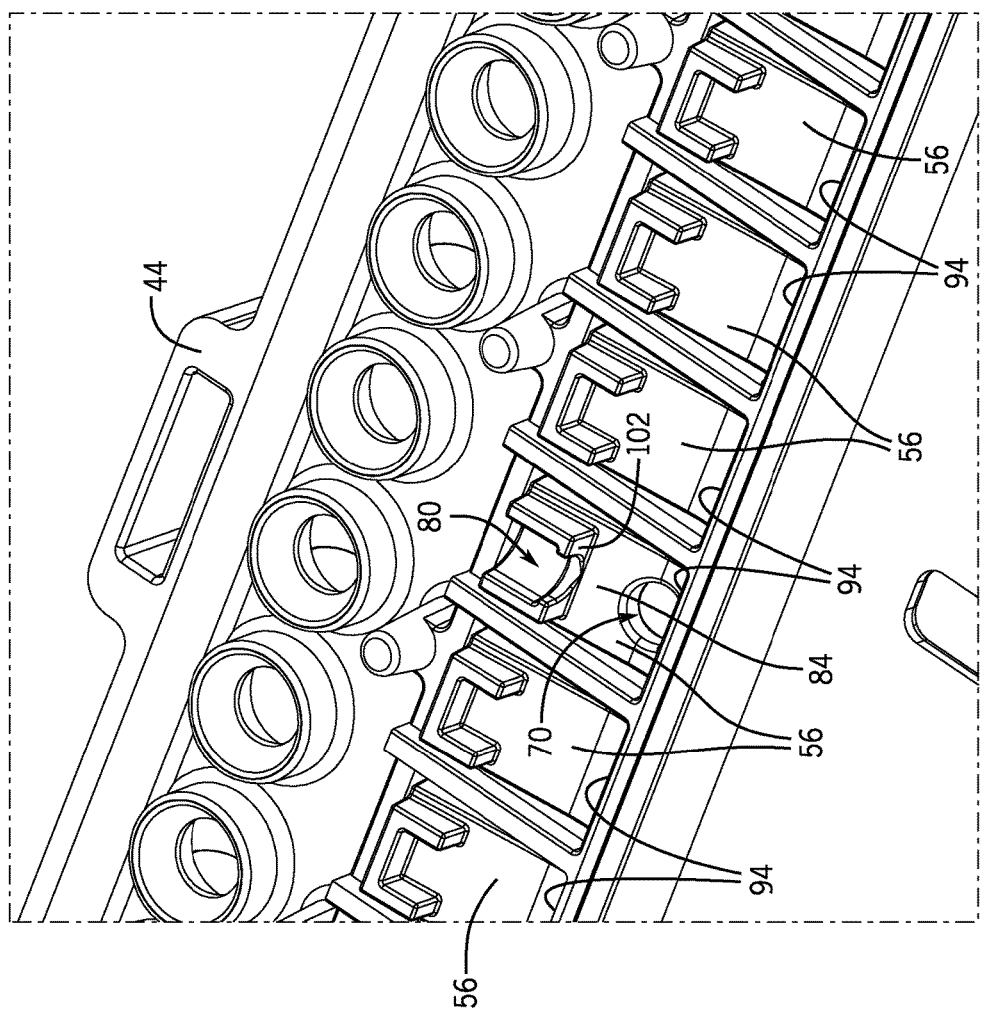
FIG. 7 is a bottom perspective view of an embodiment of the bus bar carrier of FIG. 4, in accordance with an aspect of the present disclosure.

Overhead and bottom perspective views of embodiments of the bus bar carrier 44 (e.g., of FIG. 4) having the fingers 56 are shown in FIGS. 6 and 7, respectively. In FIG. 6, as previously described, the finger 56 configured to retain a sensor includes the bulge 72 of material (with a cavity disposed underneath the bulge 72) extending from the first surface 82 (e.g., top surface). The finger 56 also includes the opening 70. Further, in the illustrated embodiment, the sides 96 (e.g., longitudinal sides, not the edge 94) of all the fingers 56 are not joined with the features of the bus bar carrier 44. Accordingly, each finger 56 may readily flex about a contact point (e.g., the integral edge 94) of the finger 56, where the contact point (e.g., the integral edge 94) is the only portion of the finger 56 integral with the bus bar carrier 44.

In FIG. 6, an embodiment of the bus bar carrier 44 showing the cavity 80 of the finger 56 is shown. In the illustrated embodiment, the cavity 80 is at least partially defined by a bridge 102 of material extending from the second surface 84 (e.g., bottom surface). In accordance with the present disclosure, the bridge 102 may be configured to contact the electrochemical cell over which the bridge 102 is disposed. Additionally or alternatively, the sensor retained within the cavity 80 of the bridge 102 may contact the electrochemical cell over which the bridge 102 is disposed. It should be noted that the distance 88 of the second portion 92 of the finger 56 described with reference to FIG. 5 may correspond to a distance measured through the bridge 102 shown in FIG. 7. Further, it should be noted that the fingers 56 not configured to retain a corresponding sensor may also include the bridge 102, or a similarly shaped bridge, configured to contact the electrochemical cell over which the bridge 102, or the similarly shaped bridge, is disposed.

Turning now to FIG. 8, an embodiment of the bus bar carrier 44 (e.g., for use in the battery module 20 of FIG. 3) having the finger 56 configured to retain a sensor is shown. In the illustrated embodiment, the finger 56 is integral with the bus bar carrier 44 along the edge 94 of the finger 56. The finger 56 includes a first portion 120 (e.g., first horizontal portion extending in direction 95) extending from the edge 94, a second portion 122 (e.g., second angled portion) extending from the first portion 120 at an angle, and a third portion 124 (e.g., third horizontal portion extending in direction 95) extending from the second portion 122. As shown, the bulge 72 of material is disposed on the third portion 124 of the finger 56. The cavity 80 may be disposed under the bulge 72 and/or may be at least partially defined the by bulge 72. Further, an opening 126 to the cavity 80 may be disposed through the bottom surface 84 of the finger 56 along the second portion 122 (e.g., second angled portion) of the finger 56. The opening 70 (e.g., through which a lead wire may extend), in the illustrated embodiment, is disposed partially in the first portion 120 and partially in the second portion 122. However, in another embodiment, the opening 70 may be disposed entirely in the first portion 120 or entirely in the second portion 122.

Schematic side views of embodiments of the finger 56 for use in the battery module 20 of FIG. 3 are shown in FIGS. 9 and 10. In FIG. 9, the finger 56 corresponds with the embodiment shown in FIG. 8 and includes the first portion 120 (e.g., extending from the edge 94 integral with the bus bar carrier 44), the second portion 122, and the third portion 124. The orthogonal thickness (e.g., orthogonal with the first surface 82 and the second surface 84) through the first portion 120 and the second portion 122 may be substantially the same. The thickness through the third portion 124 may also be the same, or may be increased around the bulge 72 of material for structural rigidity. As shown, the second portion 122 extends from the first portion 120 at an angle 130, which enables the finger 56 to press against an electrochemical cell disposed under the finger 56.

In FIG. 10, the finger 56 corresponds with the embodiments shown in FIGS. 5-7 and includes the first portion 86 (e.g., having the thickness with the greater distance 88 around the bulge 72 of material and/or outside of the cavity 80) and the second portion 92 (e.g., having the thickness with the lesser distance 90). The second portion 92 of the finger 56 extends from the edge 94 (e.g., the edge 94 integral with the bus bar carrier 44) at the angle 100 to enable the finger 56 to contact an electrochemical cell under the finger 56.

It should be noted that, in the embodiments illustrated in FIGS. 9 and 10, the angles 130, 100, respectively, may be selected/determined to calibrate a desired force exerted by the finger 56 against the corresponding electrochemical cell. For example, the angle 130 in FIG. 9 may be made more or less obtuse to enable extension of the finger 56 downwardly (e.g., opposite to direction 58) less or more, respectively. Further, the angle 100 in FIG. 10 may be made more or less acute to enable extension of the finger 56 downwardly (e.g., opposite to direction 58) more or less, respectively. Further still, a material of the finger 56 and/or corresponding electrochemical cell may be selected/determined to calibrate the desired force exerted by the finger 56 against the corresponding electrochemical cell.

FIGS. 11 and 12 are schematic views of embodiments of the battery module 20 of FIG. 3. In the illustrated embodiment in FIG. 11, the battery module 20 includes the housing 30, a base 140 of the housing 30, the bus bar carrier 44 disposed along a top side 138 of the housing 30, and at least one finger 56 that is integral with the bus bar carrier 44 and configured to exert a force against an electrochemical cell disposed in the housing 30. For purposes of the discussion below, the electrochemical cell is not shown.

In general, the finger 56 extends a distance 142 downwardly from a bottom surface 143 of the bus bar carrier 44. The distance 142 is selected/determined such that the bottom surface 84 of the finger 56 (or a sensor retained proximate to the bottom surface 84) is disposed a distance from the base 140 of the housing 30 no more than a minimum height tolerance 144 of the electrochemical cells 32. For example, during manufacturing, the electrochemical cells may include a height between the minimum height tolerance 144 and a maximum height tolerance. Manufactured electrochemical cells may be tested to determine whether the electrochemical cells include the height between the minimum height tolerance 144 and the maximum height tolerance. Electrochemical cells that do not include the height between the minimum height tolerance 144 and the maximum height tolerance may be discarded or used for other purposes. To ensure that the finger 56 contacts and holds the electrochemical cells down, the finger 56 extends downwardly (e.g., opposite to direction 58) the distance 142 to ensure that a distance between the bottom surface 84 of the finger 56 and the base 140 (e.g., base surface) of the housing 30 (e.g., notwithstanding the electrochemical cell contacting the finger 56 and causing the finger 56 to flex upwards) is no greater than the minimum height tolerance 144 of the electrochemical cell. It should be noted that the minimum height tolerance 144 of the electrochemical cell is measured from a terminal end of the electrochemical cell to a base of the electrochemical cell opposite to the terminal end. Further, it should be noted that the distance 142 may be selected/determined to calibrate the force exerted by the finger 56 against the corresponding electrochemical cell. As previously described, an angle by which the finger 56 extends from the bus bar carrier 44 may be selected/determined to calibrate the distance 142 and/or the force exerted by the finger 56 against the electrochemical cell.

In FIG. 12, the battery module 20 includes a thermal pad 150 sandwiched between the base 140 of the housing 30 and where the base of the electrochemical cell would be. In other words, in the embodiment in FIG. 12, the electrochemical cell's base would abut the thermal pad 150. Thus, to ensure contact between the finger 56 and the electrochemical cell, the distance between the bottom surface 84 of the finger 56 (or a sensor disposed proximate to the bottom surface 84) and the thermal pad 150 can be no greater than the minimum height tolerance 144 of the electrochemical cells. Thus, the finger 56 extends downwardly (e.g., opposite to direction 58) the distance 142 to ensure that a distance between the bottom surface 84 of the finger 56 and the thermal pad 150 (e.g., notwithstanding the electrochemical cell contacting the finger 56 and causing the finger 56 to flex upwards) is no greater than the minimum height tolerance 144 of the electrochemical cell. It should be noted that the bus bar carrier 44 in FIGS. 11 and 12 may include multiple fingers 56, each finger being integral with the bus bar carrier 44, and that the housing 30 may be configured to house multiple corresponding electrochemical cells 32. Each electrochemical cell 32 may include a different height, but all of the heights are within the minimum height tolerance 144 and the maximum height tolerance, thus ensuring that all the fingers 56 (or sensors disposed in the fingers 56) contact corresponding electrochemical cells 32. However, because the electrochemical cells 32 may include variable height, forces exerted against the fingers 56 by the electrochemical cells 32 and against the electrochemical cells 32 by the fingers 56 may also vary. Further, it should be noted that the distance 142 may be selected/determined to calibrate the force exerted by the finger 56 against the corresponding electrochemical cell. As previously described, an angle by which the finger 56 extends from the bus bar carrier 44 may be selected/determined to calibrate the distance 142 and/or the force exerted by the finger 56 against the electrochemical cell.

One or more of the disclosed embodiments, alone or in combination, may provide one or more technical effects useful in the manufacture of battery modules, and portions of battery modules. For example, in accordance with the present disclosure, a bus bar carrier of a battery module may include fingers that extend downwardly from the bus bar carrier and toward electrochemical cells disposed in a housing of the battery module. At least one of the fingers may include an opening configured to enable passage of a lead wire from a top surface to a bottom surface of the finger. The finger may also include a cavity proximate to the bottom surface of the finger and configured to retain a sensor coupled to the lead wire. The opening and the cavity may enable communication (e.g., fluid communication, electrical communication) between the sensor and the electrochemical cell. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a plurality of electrochemical cells;
a bus bar carrier, wherein the bus bar carrier comprises a finger integral with the bus bar carrier at a proximal end of the finger, wherein the finger comprises a first surface, a second surface opposite to the first surface and configured to be disposed proximate to a first electrochemical cell of the plurality of electrochemical cells, a thickness extending between the first surface and the second surface, an opening extending through the first surface, through the thickness, and through the second surface, and a cavity disposed adjacent to a distal end of the finger and exposed through the second surface of the finger, wherein the opening is disposed between the proximal end of the finger and the cavity;
a lead wire passing through the opening from the first surface of the finger to the second surface of the finger; and
a sensor coupled to the lead wire to enable communication between the sensor and the first electrochemical cell, wherein the sensor is disposed in the cavity;
wherein the plurality of electrochemical cells comprises a plurality of terminal ends, and the bus bar carrier is disposed over the plurality of electrochemical cells and immediately adjacent to the plurality of terminal ends.

2. The battery module of claim 1, wherein the plurality of electrochemical cells comprises a plurality of lithium-ion (Li-ion) electrochemical cells.

3. The battery module of claim 1, wherein the plurality of electrochemical cells comprises a plurality of prismatic electrochemical cells.

4. The battery module of claim 1, wherein the finger comprises a first portion and a second portion, wherein a thickness of the first portion comprises a first distance, wherein a thickness of the second portion comprises a second distance, wherein the first distance is greater than the second distance, and wherein the cavity is disposed in the first portion.

5. The battery module of claim 4, wherein the opening is disposed in the second portion of the finger.

6. The battery module of claim 1, wherein the sensor is sandwiched between the first electrochemical cell and the finger.

7. The battery module of claim 6, wherein the sensor is a temperature sensor, a voltage sensor, or both.

8. The battery module of claim 1, wherein the finger is configured to flex in response to a force exerted against the finger by the first electrochemical cell.

9. The battery module of claim 1, wherein the finger is coupled to the bus bar carrier along only one side of the finger such that the finger is configured to flex about the only one side.

10. The battery module of claim 1, wherein the battery module comprises a housing, wherein the housing comprises a surface on which bases of the plurality of electrochemical cells are disposed, and wherein the finger is positioned on the bus bar carrier such that the second surface of the finger is disposed, at most, a first distance from the surface of the housing and the first distance corresponds with a first minimum height tolerance of the first electrochemical cell, measured from a base of the first electrochemical cell to a terminal end of the first electrochemical cell.

11. The battery module of claim 1, wherein the battery module comprises a housing, wherein the battery module comprises one or more thermal pads, wherein the housing comprises a surface on which the one or more thermal pads are disposed, wherein bases of the plurality of electrochemical cells are disposed on the one or more thermal pads such that the one or more thermal pads are positioned between the surface of the housing and the bases of the plurality of electrochemical cells, and wherein the finger is positioned on the bus bar carrier such that the finger is disposed, at most, a first distance from the thermal pads of the battery module and the first distance corresponds with a first minimum height tolerance of the first electrochemical cell, measured from a base of the first electrochemical cell to a terminal end of the first electrochemical cell.

12. The battery module of claim 1, wherein the sensor is in fluid communication with the first electrochemical cell.

13. The battery module of claim 1, wherein the sensor is in electrical contact with the first electrochemical cell.

14. The battery module of claim 1, wherein the finger comprises a first portion through which the opening is disposed, a second portion in which the cavity is disposed, and a third angled portion extending between the first portion and the second portion at a non-right angle.

15. A battery module, comprising:
a lithium-ion (Li-ion) electrochemical cell having a terminal end comprising at least one terminal;
a bus bar carrier disposed over the Li-ion electrochemical cell and proximate to the terminal end, wherein the bus bar carrier comprises a finger integral with the bus bar carrier along an edge of the finger, wherein the finger comprises a first portion extending from the edge and having a first thickness, wherein the finger comprises a second portion extending from the first portion and having a second thickness greater than the first thickness, wherein an opening is disposed through the first portion, wherein a cavity is disposed in the second portion, and wherein the cavity is exposed to the terminal end of the Li-ion electrochemical cell;
a sensor disposed in the cavity and in communication with the Li-ion electrochemical cell; and
a lead wire extending from the sensor and through the opening.

16. The battery module of claim 15, wherein the Li-ion electrochemical cell is a prismatic Li-ion electrochemical cell.

17. The battery module of claim 15, wherein the finger is integral with the bus bar carrier only along the edge of the finger such that the finger is configured to flex about the edge in response to a force exerted against the finger via the Li-ion electrochemical cell.

18. The battery module of claim 15, wherein the sensor is a temperature sensor, a voltage sensor, or both.

19. A bus bar carrier of a battery module, comprising:
a finger integral with the bus bar carrier only along a first edge of the finger, a first portion of the finger extending from the first edge and having a first thickness, a second portion of the finger extending from the first portion and having a second thickness greater than the first thickness, an opening disposed through the first portion, and a cavity disposed in the second portion and exposed along a bottom surface of the second portion.

20. The bus bar carrier of claim 19, wherein the finger is positioned on the bus bar carrier in an area of the bus bar carrier accessible to a terminal end of a prismatic lithium-ion (Li-ion) electrochemical cell of the battery module.

21. The bus bar carrier of claim 19, wherein the opening is sized to accommodate a lead wire of the battery module and the cavity is sized to accommodate a sensor coupled to the lead wire of the battery module.

22. The bus bar carrier of claim 19, wherein the first edge comprises a third thickness and the third thickness is less than the first and second thicknesses such that the finger is configured to flex about the first edge in response to a force exerted against the finger.

* * * * *